US012599517B2

(12) United States Patent
Daouk

(10) Patent No.: US 12,599,517 B2
(45) Date of Patent: Apr. 14, 2026

(54) STRETCHER EQUIPPED WITH SYSTEMS FOR ATTACHING REMOVABLE MEDICAL EQUIPMENT

(71) Applicant: Antar Daouk, Paris (FR)

(72) Inventor: Antar Daouk, Paris (FR)

( * ) Notice: Subject to any disclaimer, the term of this patent is extended or adjusted under 35 U.S.C. 154(b) by 163 days.

(21) Appl. No.: 18/032,035

(22) PCT Filed: Oct. 15, 2021

(86) PCT No.: PCT/FR2021/051799

§ 371 (c)(1),
(2) Date: Apr. 14, 2023

(87) PCT Pub. No.: WO2022/079396

PCT Pub. Date: Apr. 21, 2022

(65) Prior Publication Data

US 2023/0390128 A1 Dec. 7, 2023

(30) Foreign Application Priority Data

Oct. 15, 2020 (FR) ....................................... 2010538

(51) Int. Cl.

*A61G 1/017* (2006.01)
*A61G 1/013* (2006.01)
*A61G 1/04* (2006.01)
*A61G 1/044* (2006.01)
*A61G 1/048* (2006.01)

(52) U.S. Cl.

CPC ............. *A61G 1/017* (2013.01); *A61G 1/013* (2013.01); *A61G 1/044* (2013.01); *A61G 1/048* (2013.01); *A61G 1/04* (2013.01)

(58) Field of Classification Search

CPC ........ A61G 1/017; A61G 1/013; A61G 1/044; A61G 1/048; A61G 1/04

USPC ..................................................... 5/625–628

See application file for complete search history.

(56) References Cited

U.S. PATENT DOCUMENTS 2,400,155 A * 5/1946 Letschert et al. ....... A61G 1/017 297/183.2
4,711,487 A * 12/1987 Brooks ................ A61G 1/0212 297/484
4,963,762 A * 10/1990 Brooks .................. A61G 1/017 297/39

(Continued)

FOREIGN PATENT DOCUMENTS

CN 104487040 A 4/2015
DE 10318903 A1 * 12/2003 ............. A61G 1/013

(Continued)

*Primary Examiner* — Robert G Santos

(74) *Attorney, Agent, or Firm* — Nath, Goldberg & Meyer; Joshua B. Goldberg

(57) ABSTRACT

The invention relates to a stretcher intended for transporting patients, comprising a frame including poles, the ends of which act as carrying handles, said frame being equipped with at least one attachment system making it possible to attach at least one piece of equipment for providing assistance to a patient being transported, as well as a series of trays constituting a lying surface which can be articulated according to the desired positions for the patient, said articulated trays being attached via articulation systems to the frame, said trays being provided with a system for holding the patient. Stretchers for transporting patients.

20 Claims, 10 Drawing Sheets

(56) References Cited

U.S. PATENT DOCUMENTS

| | | | | | |
|---|---|---|---|---|---|
| 5,572,756 | A * | 11/1996 | Muuranen | A61G 1/0262 5/625 |
| 9,009,896 | B2 * | 4/2015 | Suh | A47C 19/122 5/618 |
| 9,205,007 | B2 * | 12/2015 | Chinn | A61G 1/048 |
| 10,583,055 | B2 * | 3/2020 | Cable | A61G 1/04 |
| 11,071,663 | B1 * | 7/2021 | Cable | A61G 1/048 |
| 2013/0312185 | A1 | 11/2013 | Suh | |
| 2013/0340170 | A1 * | 12/2013 | Chinn | A61G 1/04 5/628 |
| 2017/0112693 | A1 | 4/2017 | Cable et al. | |
| 2023/0390128 | A1 * | 12/2023 | Daouk | A61G 1/048 |

FOREIGN PATENT DOCUMENTS

| | | | | |
|---|---|---|---|---|
| DE | 10318903 | B4 * | 10/2005 | A61G 1/013 |
| FR | 3063428 | A1 | 9/2018 | |
| FR | 3115196 | A1 * | 4/2022 | A61G 1/017 |
| JP | 2013-542045 | A | 11/2013 | |
| WO | WO-9412137 | A1 * | 6/1994 | A61G 1/0262 |
| WO | 2012064942 | A2 | 5/2012 | |
| WO | 2013/190552 | A1 | 12/2013 | |
| WO | WO-2022079396 | A1 * | 4/2022 | A61G 1/017 |

* cited by examiner

STRETCHER EQUIPPED WITH SYSTEMS FOR ATTACHING REMOVABLE MEDICAL EQUIPMENT

This is a National Phase Application filed under 35 U.S.C. 371 as a national stage of PCT/FR2021/051799, filed Oct. 15, 2021, an application claiming the benefit of French Application No. 2010538, filed Oct. 15, 2020, the content of each of which is hereby incorporated by reference in its entirety.

TECHNICAL FIELD

The present invention concerns the general technical field of stretchers for transporting patients.

PRIOR TECHNIQUE

In the past, the stretchers generally consisted of two parallel tubes serving as handles, connected by a textile to receive the patient and transfer him. Over the years, the stretchers have evolved into more complex shapes with patient support systems. As stretchers are common during the evacuation of wounded during conflicts, the dimensions and applicable standards have been standardized.

Advances in care have meant that the patient must sometimes be fitted in order to maintain his ability to withstand transport in the best possible conditions. These advances mainly consist of the addition of monitoring and assistance systems for vital functions, respiratory aids, means of medication by infusion, etc. At this point, the simultaneous transfer of the patient and the equipment to which he is connected becomes a necessity. From common experience, the prevailing urgency and the technical means not adapted to the situation mean that caregivers are obliged to accompany the patient throughout his stretcher and/or his transfer, either by carrying the medical devices, or by placing these medical devices on an auxiliary trolley that must follow the patient very closely so as not to interrupt the vital link between these medical devices and the patient, or even in the worst case by placing them on the patient himself. This problem also arises when one has to stow the stretcher in a land/sea/air transport vector and find a support to install the accompanying medical equipment. It may happen that the dedicated supports are not compatible with the attachment systems of the medical equipment connected to the patient.

Unfortunately, when these supports are not compatible, vital urgency takes precedence over installation safety and makeshift solutions are improvised with sometimes undesirable consequences.

Moreover, conventional stretchers only offer a horizontal lying surface without the possibility of any lifting. The position imposed by the doctor can be an inclination of the trunk and/or a lifting of the lower limbs for a shock.

An additional difficulty appears during the immobilization of the patient on his stretcher to secure the latter during his transfer in land/air/nautical transport means: a set of conventional transverse straps proves to be insufficient to maintain the patient in all the axes. Furthermore, another medical necessity consists in placing the patient on a hard surface in order to be able, in case of need, to carry out emergency interventions (cardiac massages, defibrillation, etc.), which is not compatible with a classic soft lying surface.

DISCLOSURE OF THE INVENTION

The main purpose of the present invention is therefore to remedy all or part of the drawbacks described above and to propose a new stretcher which in particular allows transport of patients under optimal conditions of comfort, safety and medical assistance for transported patients.

Another object of the invention aims to provide a new stretcher which is of particularly robust and reliable construction.

Another object of the invention aims to provide a new stretcher which is of particularly simple design.

Another object of the invention aims to provide a new stretcher which is of particularly light construction.

Another object of the invention aims to provide a new stretcher which is easy to implement, by a limited number of users, in particular under health emergency conditions.

Another object of the invention aims to provide a new stretcher whose use is particularly safe and ergonomic.

The objects assigned to the invention are achieved with the aid of a stretcher intended for the transport of patients comprising

- a frame including poles, whose ends serve as carrying handles, said frame being equipped with at least one attachment system making it possible to attach at least one equipment for providing assistance to a patient being transported;
- a series of trays constituting a lying surface that can be articulated according to the desired positions for the patient, said articulated trays being fixed by means of articulation systems on the frame, said trays being equipped with a patient holding system.

BRIEF DESCRIPTION OF THE DRAWINGS

Other particularities and advantages of the invention will appear and emerge in more detail on reading the description given below, with reference to the appended drawings, given solely by way of illustrative and non-limiting example, among which.

WAYS TO REALIZE THE INVENTION

Figure 1:
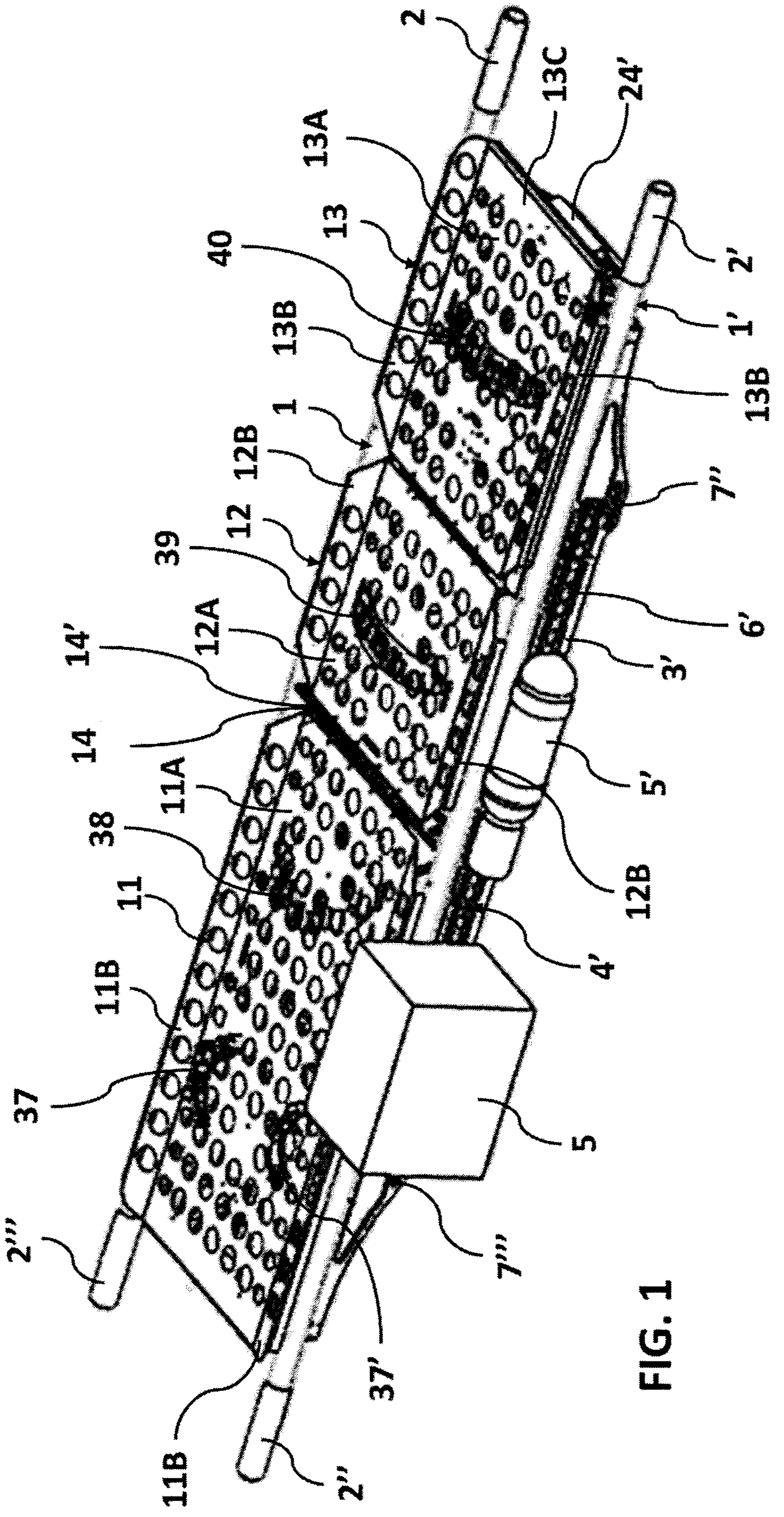
FIG. 1 illustrates, in a top perspective view, an embodiment of a stretcher in accordance with the invention. The lying surface is illustrated horizontal, that is to say with all of these trays in the folded, lowered position, so that each tray extends along an average extension plane which is parallel to a plane in which are inscribed the longitudinal extension directions of the poles of the frame of the stretcher. Assistance equipment for the transported patient, such as medical equipment, is shown attached to the stretcher using an attachment system. The stretcher is provided with projections designed and configured to receive systems for anchoring the stretcher to a transport vector.

The invention concerns a stretcher intended for transporting patients, preferably humans, whose two embodiments are illustrated by way of example in the figures. The stretcher in accordance with the invention comprises a frame, that is to say a support structure or rigid chassis, including poles 1, 1'. Typically, said poles 1, 1' are two in number, and each extend longitudinally in a direction of average longitudinal extension. Advantageously, the poles 1, 1' are arranged parallel to each other, that is to say with their average longitudinal extension directions substantially parallel to each other. The ends of the poles 1, 1' act as carrying handles 2, 2', 2'', 2''', that is to say they each form a carrying handle 2, 2', 2'', 2''' or are each provided with a carrying handle 2, 2', 2'', 2''', to allow users, such as nursing staff, to manually carry the stretcher and the patient positioned on it. Advantageously, the poles 1, 1' each comprise a tube or a rigid rod, for example made of metal and preferably of aluminum, and for example of circular transverse section. The implementation of such poles 1, 1' allows easy manual carrying of the stretcher by two people (or users).

The frame of the stretcher is equipped with at least one attachment system 4, 4' making it possible to attach (that is to say designed and configured to attach, secure) at least one assistance equipment 5, 5', 5'', 5''' to a transported patient. The implementation of such an attachment system 4, 4', and preferably of several attachment systems 4,4', has several advantages. Indeed, such an attachment system 4, 4' makes it possible to be secured to the stretcher, preferably temporarily, assistance equipment 5, 5', 5'', 5''' potentially essential for patient care, so as to avoid breaking the patient/equipment link 5, 5', 5'', 5'''', to easily reposition the location and/or replacement of the equipment 5, 5', 5'', 5''', to remain in position during the transfer in a vector (or vehicle) of transport in the event that the latter is devoid of a system for attaching these equipment 5, 5', 5'', 5'''. The stretcher in accordance with the invention also comprises a series of trays 11, 12, 13 constituting a lying surface intended to receive the body of a patient to be transported in its entirety. By «series of trays», it is expected here, as illustrated in the figures, a plurality of successive trays 11, 12, 13, arranged one after the other, so as to form together said lying surface. The lying surface advantageously extends along an average longitudinal extension direction (or axis) of the lying surface which is substantially parallel to the average longitudinal extension directions of the poles 1, 1'. The trays 11, 12, 13 are advantageously rigid, that is to say they are designed and configured so as not to be deformed under the effect of the weight of the body of the transported patient, in normal use of the stretcher.

The trays 11, 12, 13 of the lying surface can be articulated according to the desired positions for the patient. It is therefore a question of trays 11, 12, 13 which are articulated and therefore movable, with respect to the frame of the stretcher, so as to allow a modification of the configuration of the lying surface by modifying the position of all or part of the trays 11, 12, 13 relative to the frame. In other words, each of the trays 11, 12, 13 forming the lying surface is articulated, and can therefore move between at least two different positions. Advantageously, as in the embodiments illustrated in the figures, each of the trays 11, 12, 13 is articulated relative to the frame of the stretcher so as to be able to move between a so-called «folded» or «horzontal» position, in which the tray 11, 12, 13 extends along an average extension plane which is parallel to the plane in which are advantageously inscribed the longitudinal extension directions of the poles 1, 1' (FIGS. 1, 4 and 9), and at least another position, called «raised», «unfolded», «elevated» and/or even «inclined» (FIGS. 2, 3, 5 to 8 and 10). As such, said articulated trays 11, 12, 13 are fixed (directly or indirectly) to the frame of the stretcher by means of articulation systems 14, 14', 15, such as for example hinges. The fact that each of the trays 11, 12, 13 of the lying surface is articulated makes it possible to best adapt the configuration of the lying surface to the needs and/or the state of health of the transported patient, as well as to the needs of the nursing staff working with the patient. This contributes to the comfort and preservation of the patient health.

Advantageously, the trays 11, 12, 13 of the lying surface, and preferably each of the trays 11, 12, 13, are equipped with a patient holding system 37, 37', 38, 39, 40, that is to say, a system or device designed and configured to hold the patient in position on the lying surface. Comprising for example a set of straps, such a holding system makes it possible to secure the position of the patient, in particular during transport of the latter, whether on foot by people carrying the stretcher or in/on a transport vector (or vehicle), for example on a rolling cart, in an aircraft (helicopter, airplane, etc.), or in a road vehicle (ambulance, etc.). The patient holding system 37, 37', 38, 39, 40 therefore advantageously makes it possible to prevent the patient from falling off the lying surface, and to hinder as much as possible movements of the latter likely to harm his state of health (for example in the case of bone fracture(s)) or to the good connection between the patient and the assistance equipment 5, 5', 5'', 5''' fixed to the stretcher.

Thanks to the combination of the above technical characteristics, the stretcher in accordance with the invention thus advantageously allows patient transport in optimal conditions of comfort, safety and medical assistance for the transported patients. In particular, it advantageously becomes possible to attach to the stretcher, securely, all the medical devices necessary for the care of the patient during the various phases of his transfer avoiding that additional means and/or caregivers carry these medical devices in accompaniment of the patient to eliminate the risk of severing the connection with the patient.

Advantageously, as in the embodiments illustrated in the figures, the series of trays 11, 12, 13 constituting the lying surface is formed of a back tray 11, a thigh tray 12 and a leg tray 13. In other words, the series of trays 11, 12, 13 comprises only three separate and juxtaposed articulated trays, namely a back tray 11 intended to receive the back (and preferably also the head) of a patient, a thigh tray 12 intended to receive the patient buttocks and thighs, and a leg tray 13 intended to receive the legs (and preferably the feet) of said patient. Such a design with three articulated trays 11, 12, 13 (and therefore the absence of an immobile, non-articulated tray) contributes to great modularity, to the simplicity and reliability of operation of the stretcher, as well as to the transported patient comfort. Each of the trays 11, 12, 13 making up the lying surface typically extends, along the average longitudinal extension direction (or axis) of the lying surface, between an upper end and an opposite lower end (in consideration of the orientation of the head and feet of the patient positioned on the lying surface). Preferably, each of the trays 11, 12, 13 of the lying surface comprises a substantially rigid patient support plate 11A, 12A, 13A to each support a part of the patient body to be transported. The plates 11A, 12A, 13A are, for example, made of metal, plastic or even a composite material. Preferably, the plates 11A, 12A, 13A are made of aluminum, which gives them strength, lightness, as well as good resistance to corrosion. Advantageously, the plates 11A, 12A, 13A can be apertured, perforated, as in the embodiments illustrated in the figures, so as to limit the weight of the stretcher. Advantageously, as in the embodiments illustrated in the figures, the plates 11A, 12A, 13A can have lateral edges 11B, 12B, 13B which are curved, folded, upwards (that is to say in the direction of the patient), for example at an angle of approximately 30° with respect to an extension average plane of a central part of the plates 11B, 12B, 13B located between the lateral edges 11B, 12B, 13B. This advantageously makes it possible, on the one hand, to confer good rigidity on the plates 11A, 12A, 13A, even when the thickness of the latter is selected relatively low, and on the other hand to contribute to a certain extent to the good holding of the patient in the axis of longitudinal extension of the lying surface.

Preferably, the back tray 11 and the leg tray 13, as well as preferably also the thigh tray 12, each comprise at least one reinforcement 17, 17', 31, 32, 25, 25' located on the back (that is to say at the rear, on a face opposite to that intended to receive the patient) of the back tray 11, of the leg tray 13, and of the thigh tray 12 if necessary. For example, the reinforcement(s) 17, 17', 31, 32, 25, 25' of trays 11, 12, 13 may comprise a reinforcing side rail, for example made of metal and preferably of aluminum, and for example with a «U» cross section. The implementation of such reinforcements 17, 17', 25, 25', 31, 32 on the back of the trays 11, 12, 13 of the lying surface in particular advantageously makes it possible to contribute to conferring on the lying surface excellent rigidity and great robustness. Advantageously, as in the embodiments illustrated in the figures, the reinforcement(s) 17, 17', 31, 32, 25, 25' of the trays 11, 12, 13, can comprise a pair of reinforcing side rails, of «U» cross section, spaced from each other and arranged parallel along the respective longitudinal extension direction of the trays 11, 12, 13. More advantageously still, the reinforcements 17, 17', 25, 25', 31, 32 of the trays 11, 12, 13 may comprise a stiffener which interconnects said reinforcing side rails.

The frame of the stretcher preferably comprises pole reinforcements 3, 3' on which the poles 1, 1' rest, so as to mechanically reinforce the poles 1, 1' and thus limit the risk of bending, buckling, of the latter under the weight of the transported patient. Advantageously perforated to reduce their weight, the pole reinforcements 3, 3' therefore form parts for mechanical reinforcement of the poles 1, 1', arranged under the poles 1, 1'. For example, the pole reinforcements 3, 3' can be made of metal and preferably aluminum. Advantageously, the pole reinforcements 3, 3' are secured by riveting to their respective pole 1, 1'. As in the embodiments illustrated in the figures, the frame of the stretcher thus advantageously comprises a pair of parallel poles 1, 1', each reinforced by a pole reinforcement 3, 3', which advantageously extends over a length which is at least equal to half, and preferably at least equal to two thirds, of the respective length of the poles 1, 1'.

Preferably, the poles 1, 1' and the pole reinforcements 3, 3' are interconnected by bridges 9, 9', 9'', 9''', 9'''' and stiffeners 10, 10'. As illustrated in the figures, the bridges 9, 9', 9'', 9''', 9'''' each form a rigid body, for example made of metal, in the general shape of an arched bridge, secured at each of its ends, preferably by riveting, to one of the pole reinforcements 3, 3' so as to keep the distance between the poles 1, 1' constant. The bridges 9, 9', 9'', 9''', 9'''' are arranged at a distance from each other in the longitudinal extension direction of the poles 1, 1', advantageously parallel to each other. The stiffeners 10, 10' each constitute a mechanical part intended to mechanically «stiffen» the frame, and in particular to oppose a deformation of the frame by translation of the poles 1, 1' relative to each other along their average longitudinal extension directions. For example, the bridges 9, 9', 9'', 9''', 9'''' and/or the stiffeners 10, 10' can be made of metal and preferably aluminum. Advantageously, each of the stiffeners 10, 10' takes the form of a monolithic rigid part, in the shape of a cross, arranged between two consecutive bridges 9', 9'', 9'''. Advantageously, the stiffeners 10, 10' are secured, preferably by riveting, on the one hand to the poles 1, 1' and/or to their pole reinforcements 3, 3', and on the other hand to at least one of the bridges 9', 9'', 9'''. For example, as in the embodiments illustrated in the figures, the frame may comprise five bridges 9, 9', 9'', 9''', 9'''' and two stiffeners 10, 10'. Such a design makes it possible to obtain a particularly rigid and robust frame, while remaining light, with excellent absorption of the mechanical forces, both static and dynamic, exerted by the body of the patient resting on the lying surface.

Advantageously, the attachment system 4, 4' of the assistance equipment(s) 5, 5', 5'', 5''' is positioned, and for example inserted, on at least one of the pole reinforcements 3, 3' of the frame. Even more advantageously, the stretcher comprises a plurality of attachment systems 4, 4' of the assistance equipment 5, 5', 5'', 5''', the latter being positioned on each of the pole reinforcements 3, 3' so that it is advantageously possible to fix the necessary assistance equipment 5, 5', 5'', 5''' either on one side or the other of the lying surface (that is to say therefore on the right or on the left of the patient), according to the needs and/or according to the accessibility to the stretcher when the latter is embarked in or on a transport vector. Preferably, the attachment system(s) 4, 4' of the assistance equipment(s) 5, 5', 5'', 5''' are secured to the frame, and are therefore not intended to be detached from the latter, in normal use of the stretcher. For example, as in the embodiments illustrated in the figures, the attachment system(s) 4, 4' are secured, preferably by riveting, to each of the pole reinforcements 3, 3'. Preferably, the attachment system(s) 4, 4' of the assistance equipment 5, 5', 5'', 5''' extend longitudinally over a length which is at least equal to one third, and preferably at least equal to half the length of the poles 1, 1'. This characteristic, implemented in the embodiments illustrated in the figures, makes it is possible to attach an assistance equipment 5, 5', 5'', 5''' as close as possible to the patient body, whether at the level of the trunk and the head, the buttocks/thighs or even the legs of the latter. According to an advantageous variant in terms of simplicity of design and use, implemented in the embodiments illustrated in the figures, the attachment system 4, 4' of the assistance equipment 5, 5'. 5'', 5''' has a series of identical repetitive shapes made up of cells 6, 6' separated by constrictions. For example, the attachment system 4, 4' comprises, or consists of, at least one aeronautical rail («aeronautical-type» rail or even «aircraft rail»). For example, as illustrated in the figures, the stretcher can comprise two attachment systems 4, 4' of the assistance equipment 5, 5', 5'', 5''', which each comprise an aeronautical rail, each of the latter being secured to one of the pole reinforcements 3, 3' of the frame, so as to extend longitudinally in a direction parallel to the respective direction of longitudinal extension of the concerned pole 1, 1'.

Preferably, one of the bridges 9'' of the frame receives the (first) articulation system 14 of the back tray 11. Advantageously, said first articulation system 14 comprises a hinge whose one of the knuckles is secured at the lower end of the back tray 11, while the other of the knuckles is secured to said bridge 9''. The first articulation system 14 of the back tray 11 is therefore secured to the frame by means of said bridge 9'', which makes it possible to make the articulation of the back tray 11 to the frame more reliable by ensuring good recovery of the mechanical forces exerted by the patient body on the back tray 11. Advantageously, for the same reasons as well as to simplify the design of the stretcher, the same bridge 9'' also receives the (second) articulation system 14' of the thigh tray 11. Advantageously, said second articulation system 14' comprises a hinge whose one of the knuckles is secured to the upper end of the thigh tray 12, while the other of the knuckles is secured to said bridge 9''.

The stretcher advantageously comprises a (first) lifting system 16 to modify the position of the back tray 11 (or «system for modifying the position of the back tray 11»). The back tray 11 being advantageously pivotally mounted relative to the frame, via the (first) means of articulation 14 of the back tray 11 to the frame, said lifting system 16 is therefore advantageously designed and configured to modify the inclination of the back tray 11 with respect to the frame, and in particular with respect to the average plane in which the average longitudinal extension directions of the poles 1, 1' are advantageously inscribed. By convention, this plane can be considered as horizontal. Preferably, the first lifting system 16 of the back tray 11 comprises at least one (first) pin 18, 18' which equips the reinforcement(s) 17, 17' of the back tray 11, and from which articulates at least one (first) connecting rod 19, 19' connected to at least one (first) slider 20, 20'. Said first connecting rod 19, 19' therefore connects the reinforcement 17, 17' of the back tray 11 to the first slider 20, 20'. Said (at least one) first slider 20, 20' is provided with one or more (first) indexing fingers 21, 21' and is slidably mounted on one or more (first) bars 22, 22' pierced with slots 23, 23' into which the or at least one of the first indexing fingers 21, 21' are inserted depending on the position of the back tray 11, the first pierced bar(s) 22, 22' being preferably fixed between two of said bridges 9, 9'. In other words, the back tray 11 is pivotally connected to the frame, on the one hand via the first articulation system 14, and on the other hand via the first connecting rod 19, 19' whose one end is pivotally secured to the reinforcement(s) 17, 17' of the back tray 11 and whose an opposite end is pivotally secured to the first slider 20, 20', so that the sliding of the latter along of the pierced bar 22, 22' results in a modification of the inclination of the back tray 11. Advantageously oriented in a direction parallel to the longitudinal extension directions of the poles 1, 1' and of the lying surface, the first pierced bars 22, 22' are preferably fixed between two consecutive bridges 9, 9'. Such a design of the first lifting system 16 of the back tray 11 advantageously allows easy and reliable guidance of the modification of the position, and more precisely of the inclination, of the back tray 11.

Preferably again, as in the embodiments illustrated in the figures, the first lifting system 16 of the back tray 11 comprises two first pins 18, 18' (that is to say a pair of first pins 18, 18') which each equip the reinforcement(s) 17, 17' of the back tray 11. The first lifting system 16 further comprises two first connecting rods 19, 19' (that is to say a pair of first connecting rods 19, 19') which are each articulated from one of the first pins 18, 18' and are each connected to a first slider 20, 20' (pair of first sliders 20, 20'). The first lifting system 16 of the back tray 11 comprises two first pierced bars 22, 22' (that is to say a pair of first pierced bars 22, 22'), advantageously fixed parallel to each other between two of said bridges 9, 9'. Each of the first sliders 20, 20' is provided with one or more first indexing fingers 21, 21' and slidably mounted on one of the first two bars 22, 22' pierced with slots 23, 23', in which are introduced the or at least one of the first indexing fingers 21, 21' depending on the position of the back tray 11. Such a «double guide» design makes it possible to make the stretcher more reliable and to reinforce it, in particular by limiting the risk of torsional deformation of the back tray 11 under the effect of mechanical forces exerted, by the patient and/or by users such as nursing staff, on the back tray 11 when the latter is in the raised, inclined position. Advantageously, the first indexing finger(s) 21, 21' are designed and configured to lock the back tray 11 at the desired position (inclination), advantageously temporarily, when the first indexing finger(s) 21, 21' are introduced into at least one of the first slots 23, 23' of the first pierced bar(s) 22, 22', so as to secure the position of the back tray 11. The first indexing finger(s) 21, 21' can each be associated with (or comprise) an elastic return means, such as a spring, to automatically return the first indexing finger(s) 21, 21' to a locked position (in which the first indexing finger(s) 21, 21' are housed at least partially in at least one of the slots 23, 23' of the first pierced bar(s) 22, 22'), when the first indexing finger(s) 21, 21' occupy an unlocked position (in which the first indexing finger(s) 21, 21' are not housed at least partially in at least one of the first slots 23, 23' of the first pierced bar(s) 22, 22').

The stretcher further comprises, preferably, a (first) device for unlocking the position of the back tray 11, designed and configured to cooperate with the first indexing finger(s) 21, 21' in order to bring this latter in the unlocked position when they occupy(s) said locked position, and thus to allow a modification of the position of the back tray 11. It is preferably a manual unlocking device, intended to be directly implemented by hand, by a user, and for example by a nursing staff working with the patient to be transported. When the stretcher comprises a plurality of first indexing fingers 21, 21', and for example comprises two first indexing fingers 21, 21' with which two first sliders 20, 20' are respectively provided, the first unlocking device can advantageously include a (first) mechanical means 35 which interconnects the first indexing fingers 21, 21'. Thus, an unlocking action engaged against the first unlocking device makes it possible to simultaneously bring all the first indexing fingers 21, 21' into the unlocked position, which allows simple and rapid unlocking of the position of the back tray 11, especially in a health emergency for the patient.

Even more preferably, as in the embodiments illustrated in the figures, the (first) lifting system 16 of the back tray 11 comprises a (first) handle 24 (or upper handle) to allow a user to manually slide said at least one first slider 20, 20' along said at least one first pierced bar 22, 22' (or each of said first sliders 20 along each of the first pierced bars 22, 22' respectively). The first handle 24 is therefore connected, secured to said at least one first slider 20, 20'. In the event of a plurality of first sliders 20, 20', as in the embodiments illustrated in the figures, the first lifting system 16 of the back tray 11 can advantageously comprise a single first handle 24, which is secured to each of the first sliders 20. The first mechanical means 35 connecting the first indexing fingers 21, 21' to each other can then advantageously comprise a (first) graspable part 36 movably mounted relative to the first handle 24. For example, the first graspable part 36 can comprise a strap portion, or a plastic or elastomeric part, and be connected to the first indexing fingers 21, 21' via cable portions and/or rings. The first movable graspable part 36 is advantageously arranged close to the first handle 24, to allow the user to bring the first handle 24 and the first movable graspable part 36 closer together, using the fingers of the same hand, to actuate the first unlocking device, thus enclosing simultaneously with one hand the first handle 24 and the first movable graspable part 36. The first graspable part 36 thus advantageously constitutes a (first) trigger. Such a particular design makes it possible to further facilitate the unlocking of the position of the back tray 11, while retaining the possibility for the user handling the first lifting system 16 to keep one of his hands free in order to manually accompany the raising or lowering movement the back tray 11.

Preferably, the stretcher is designed and configured to allow a modification of the inclination of the thigh tray 12 and a joint modification of the altitude of the leg tray 13 with respect to the average plane in which the average longitudinal extension directions of the poles 1, 1' (or «average extension plane of the poles») are inscribed, the leg tray 13 extending in an average extension plane which remains parallel to said average plane in which the average longitudinal extension directions of the poles 1, 1' are inscribed. In other words, the thigh tray 12 and the leg tray 13 are kinematically connected. While the thigh tray 12 is pivotally articulated relative to the frame (via the second articulation system 14' of the thigh tray 12), the leg tray 13 is itself articulated relative to the frame so as to be able to move in translation with respect to the average extension plane of the poles 1, 1', in a translation direction orthogonal to the average plane of said average extension plane of the poles 1, 1', and while remaining therefore parallel to the latter. Thus, a modification of the altitude of the leg tray 13 (or «horizontal elevation» of the leg tray 13) leads to a joint modification of the inclination of the thigh tray 12, and vice versa. Otherwise formulated, an inclination of the thigh tray 12 causes the leg tray 13 to «horizontally» vary and vice versa. The kinematics of the back tray 11 is for its part advantageously independent of that of the thigh tray 12 and of the leg tray 13, so that it is possible to modify the inclination of the back tray 11 without modifying the position of the thigh tray 12 and the leg tray 13, and vice versa. The fact that the leg tray 13 is thus advantageously articulated with respect to the frame while remaining parallel to the average extension plane of the poles 1, 1', that is to say it remains permanently «horizontal» (articulation with «parallel translation»), is particularly advantageous in terms of health for the transported patient. Indeed, this makes it possible in particular to avoid too intense (or conversely too weak) reflux of blood from the legs towards the heart, which could be detrimental to the patient heart. In addition, it improves the comfort of the patient when one and/or the other of the patient legs is cast or equipped with a splint.

The stretcher advantageously comprises a (second) lifting system 16' to modify the position of the thigh tray 12 and the position of the leg tray 13 (or «system for modifying the position of the thigh tray 12 and leg tray 13»). Advantageously, the thigh tray 12 is connected to the leg tray 13 by a (third) articulation system 15, which preferably comprises a hinge (pivoting articulation), so as to link the kinematics of the thigh tray 12 and the leg tray 13. Typically, one of the hinge knuckle is attached to the lower end of the thigh tray 12, while the other hinge knuckle is attached to the upper end of the leg tray 13. Preferably, the second lifting system 16' of the thigh tray 12 and the leg tray 13 comprises at least one (second) pin 26, 26' which equips the reinforcement(s) 31, 32 of the leg tray 13, and from which is articulated at least one (second) connecting rod 27, 27' connected to at least one (second) slider 28, 28'. The second connecting rod 27, 27' therefore connects the reinforcement 31, 32 of the leg tray 13, to the second slider 28, 28'. Said (at least one) second slider 28, 28' is provided with one or more second indexing fingers 29, 29' and is slidably mounted on one or more second bars 22", 22'" pierced with slots 23", 23'" into which the or at least one of the second indexing fingers 29, 29' are inserted depending on the position of the thigh tray 12 (and the leg tray 13), the or the second pierced bars 22", 22'" being preferably fixed between two of the bridges 9'", 9"" of the frame. In other words, the thigh tray 12 is directly pivotally connected to the frame via the second articulation system 14', while the leg tray 13 is articulated with respect to the frame on the one hand via the third articulation system 15 which connects the leg tray 13 to the thigh tray 12, and on the other hand via the second connecting rod 27, 27' whose one end is pivotally secured to the reinforcement(s) 31, 32 of the leg tray 13 and whose one opposite end is pivotally secured to the second slider 28, 28', so that the sliding of the latter along the second pierced bar 22", 22'" leads to a modification of the position of the thigh tray 12 and the leg tray 13. Advantageously oriented in a direction parallel to the longitudinal extension directions of the poles 1, 1' and of the lying plane or the second pierced bars 22", 22'" are fixed preferably between two consecutive bridges 9'", 9"". Such a design of the second lifting system 16' of the thigh tray 12 and of the leg tray 13 advantageously allows easy and reliable guidance of the modification of the position of the latter.

Preferably again, as in the embodiments illustrated in the figures, the second lifting system 16' of the thigh tray 12 and of the leg tray 13 comprises two second pins 26, 26' (that is to say a pair of second pins 26, 26') which each equip the reinforcement(s) 31, 32 of the leg tray 13. The second lifting system 16' also comprises two second connecting rods 27, 27' (that is to say a pair of second connecting rods 27, 27') which each articulate from one of the second pins 26, 26' and are each connected to a second slider 28, 28' (pair of second sliders 28, 28'). The second lifting system 16' of the thigh tray 12 and the leg tray 13 comprises two second pierced bars 22", 22'" (pair of second pierced bars 22", 22'") advantageously attached parallel to each other between two of said bridges 9", 9"". Each of the second sliders 28, 28' is provided with one or more second indexing fingers 29, 29' and slidably mounted on one of the two second bars 22", 22'" pierced with slots 23", 23'", into which the or at least one of the second indexing fingers 29, 29' are introduced depending on the position of the thigh tray 12 (and of the leg tray 13). Such a "double guide" design makes the stretcher more reliable and helps reinforce it, in particular by limiting the risk of torsional deformation of the thigh tray 12 and/or of the leg tray 13 under the effect of mechanical forces exerted, by the patient and/or by users such as nursing staff, on either or both of the trays 12, 13 when the latter are in the raised position.

As envisaged hereinabove, in order to allow a modification of the inclination of the thigh tray 12 while simultaneously modifying the altitude of the leg tray 13, the latter remaining parallel to the average plane of extension of the poles 1, 1', the second lifting system 16' advantageously comprises at least one (third) pin 30, 30', distant and separate from said second pin 26, 26' mentioned hereinabove, which equips the reinforcement(s) 31, 32 of the leg tray 13, and from which is articulated at least one (third) connecting rod 33, 33' pivotally connected to the frame, so that the sliding of the second slider 28, 28' causes a modification of the inclination of the thigh tray 12 and a joint modification of the altitude of the leg tray 13. Advantageously, for the reasons set out hereinabove in terms of improving the reliability and robustness of the stretcher, the second lifting system 16' comprises two third pins 30, 30' (pair of third pins 30, 30'), which equip the reinforcement(s) 31, 32 of the leg tray 13. The second lifting system 16' also comprises two third connecting rods 33, 33' (pair of third connecting rods 33, 33') each of which articulates from one of said third pins 30, 30' and are each pivotally connected to the frame. Advantageously, as in the embodiments illustrated in the figures, the second pin(s) 26, 26' and the second connecting rod(s) 27, 27' of the second lifting system 16' are arranged in the vicinity of an upper end of the reinforcement(s) 31, 32 of the leg tray 13, while the third pin(s) 30, 30' and the third connecting rod(s) 33, 33' are respectively arranged in the vicinity of a lower end of the reinforcement(s) 31, 32 of the leg tray 13. Advantageously, the third connecting rod(s) 33, 33' can be pivotally connected to the frame via at least one platen 34, 34', joined by the third connecting rod(s) 33, 33', and attached to one of the stiffeners 10' between the two pole reinforcements 3, 3'.

Advantageously, the second indexing finger(s) 29, 29' is/are designed and configured to lock the thigh tray 12 and the leg tray 13 in the desired position (and in particular at an inclination of the thigh tray 12 and at an altitude of the desired leg tray 13) when the second indexing finger(s) 29, 29' is/are introduced into at least one of the slots 23'', 23''' of the second pierced bar(s) 22'', 22''', so as to secure the position of the thigh tray 12 and the leg tray 13. The or each of second indexing fingers 29, 29' can be associated with (or include) an elastic return means, such as a spring, to automatically return the second indexing finger(s) 29, 29' to a locked position (in which the second indexing finger(s) 29, 29' are housed at least partially in at least one of the second slots 23'', 23'' of the second pierced bar(s) 22'', 22'''), when the second indexing finger(s) 29, 29' occupy an unlocked position (in which the second indexing finger(s) 29, 29' are not housed at least partially in at least one of the second slots 23'', 23''' of the second pierced bar(s) 22'', 22''').

The stretcher further comprises, preferably, a (second) device for unlocking the position of the thigh tray 12 and the leg tray 13, that is designed and configured to cooperate with the second indexing finger(s) 29, 29' in order to bring it/them into the unlocked position when it/they occupy(ies) the said locked position, and thus to allow a modification of the position of the thigh tray 12 and of the leg tray 13. It consists preferably of a manual unlocking device, intended to be implemented directly manually by a user, and for example by a nursing staff intervening with the patient to be transported. In the advantageous case illustrated in the figures where the stretcher comprises a first system for lifting the back tray 11 and a first device for unlocking the position of the back tray, and a second system for lifting the thigh 12 and leg 13 trays and a second device for unlocking the position of the thigh 12 and leg 13 trays, said lifting systems 16, 16' and unlocking devices might then be manipulated by two different users or successively by one and same user. When the stretcher comprises a plurality of second indexing fingers 29, 29', and for example comprises two second indexing fingers 29, 29' with which two second sliders 28, 28' are respectively provided, the second unlocking device can advantageously comprise a (second) mechanical means 35' which interconnects the second indexing fingers 29, 29'. Thus, an unlocking action engaged against the second unlocking device makes it possible to simultaneously bring all the second indexing fingers 29, 29' into an unlocked position, which allows simple and rapid unlocking of the position of the thigh tray 12 and the leg tray 13, in particular in a health emergency situation of the patient.

Even more preferentially, as in the embodiments illustrated in the figures, the (second) lifting system 16' for the thigh tray 12 and the leg tray 13 comprises a (second) handle 24' (or lower handle) intended to allow a user to manually slide said at least second slider 28, 28' along said at least one second pierced bar 22'', 22''' (or each of said second sliders 28, 28' along each of the second pierced bars 22'', 22''' respectively). The second handle 24' is therefore connected and secured to said at least one second slider 28, 28'. In the event of a plurality of second sliders 28, 28', as in the embodiments illustrated in the figures, the second lifting system 16' for the thigh tray 12 and the leg tray 13 can advantageously comprise a single second handle 24', which is secured to each of the second sliders 28, 28'. The second mechanical means 35' interconnecting the second indexing fingers 29, 29' can then advantageously comprise a (second) graspable part 36' movably mounted relative to the second handle 24'. For example, the second graspable part 36' can comprise a strap portion, or a plastic or elastomeric part, and can be connected to the second indexing fingers 29, 29' via portions of cable and/or rings. The second movable graspable part 36' is advantageously arranged close to the second handle 24, to allow the user to bring the second handle 24' and the second movable graspable part 36 closer together using the fingers of the same hand to actuate the second unlocking device, thus enclosing simultaneously with one hand the second handle 24' and the second movable graspable part 36'. The second graspable part 36' thus constitutes a (second) trigger. Such a particular design makes it possible to further facilitate the unlocking of the position of the thigh tray 12 and of the leg tray 13, while retaining the possibility for the user handling the second lifting system 16' to keep one of his hands free in order to manually accompany the upward or downward movement of the thigh tray 12 and the leg tray 13.

If, as in the embodiments illustrated in the figures, the stretcher preferably comprises the first and second lifting systems 16, 16' such as described hereinabove, it is nonetheless possible that the stretcher may only comprise either of said lifting systems 16, 16', possibly in combination with a lifting system different from those described hereinabove.

Preferably, the previously mentioned system 37, 37', 38, 39, 40 for holding the patient in position on the lying surface of the stretcher is secured to the reinforcements 17, 17', 25, 25', 31, 32 of the trays 11, 12, 13 of the lying surface, and therefore in particular to the reinforcement(s) 17, 17' of the back tray 11, to the reinforcement(s) 25, 25' of the leg tray 13, as well as preferably also to the reinforcement(s) 25, 25' of the thigh tray 12. This makes it possible in particular to hold the patient in a particularly reliable manner in position on the lying surface, by limiting a risk of deformation of the trays 11, 12, 13, for example under the effects of mechanical tensile forces exerted on the holding system by the patient's body during sudden movement (acceleration, braking, etc.) of the stretcher and of the patient transported on the latter. Advantageously, as in the embodiments illustrated in the figures, the holding system 37, 37', 38, 39, 40 more specifically comprises a pair of shoulder straps 37, 37', a crotch strap 38, at least one thigh strap 39, and at least one leg strap 40, so as to thus allow an optimal maintenance of the patient's body in position on the lying surface of the stretcher.

Figure 4:
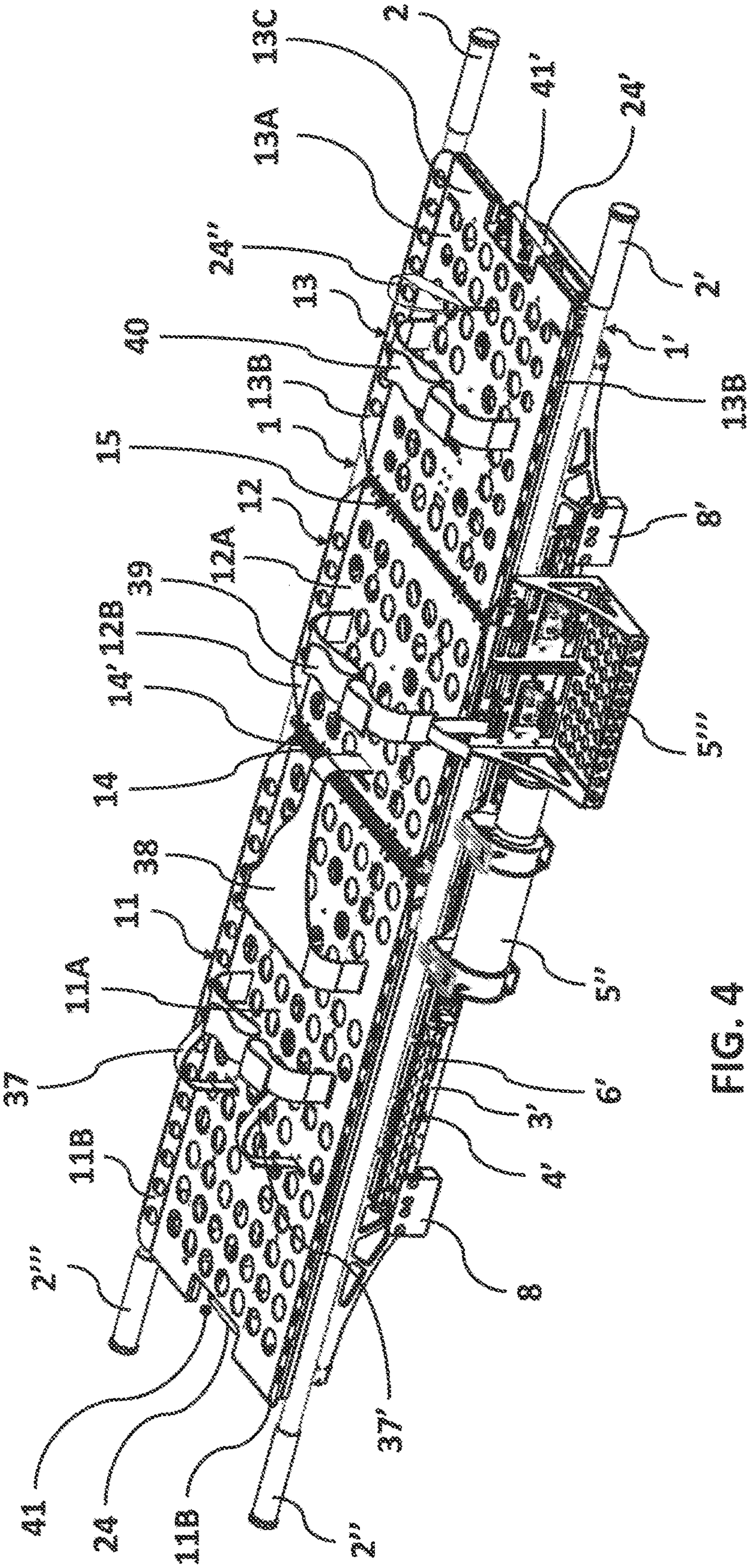
FIG. 4 illustrates, in a top perspective view, another embodiment of a stretcher according to the invention. The lying surface is shown horizontal, that is to say with the trays folded up. Equipment for assisting the transported patient, which differs from that in the example of FIG. 1, is shown attached to the stretcher using an attachment system. The stretcher comprises systems for anchoring the stretcher to a transport vector.
Figure 5:
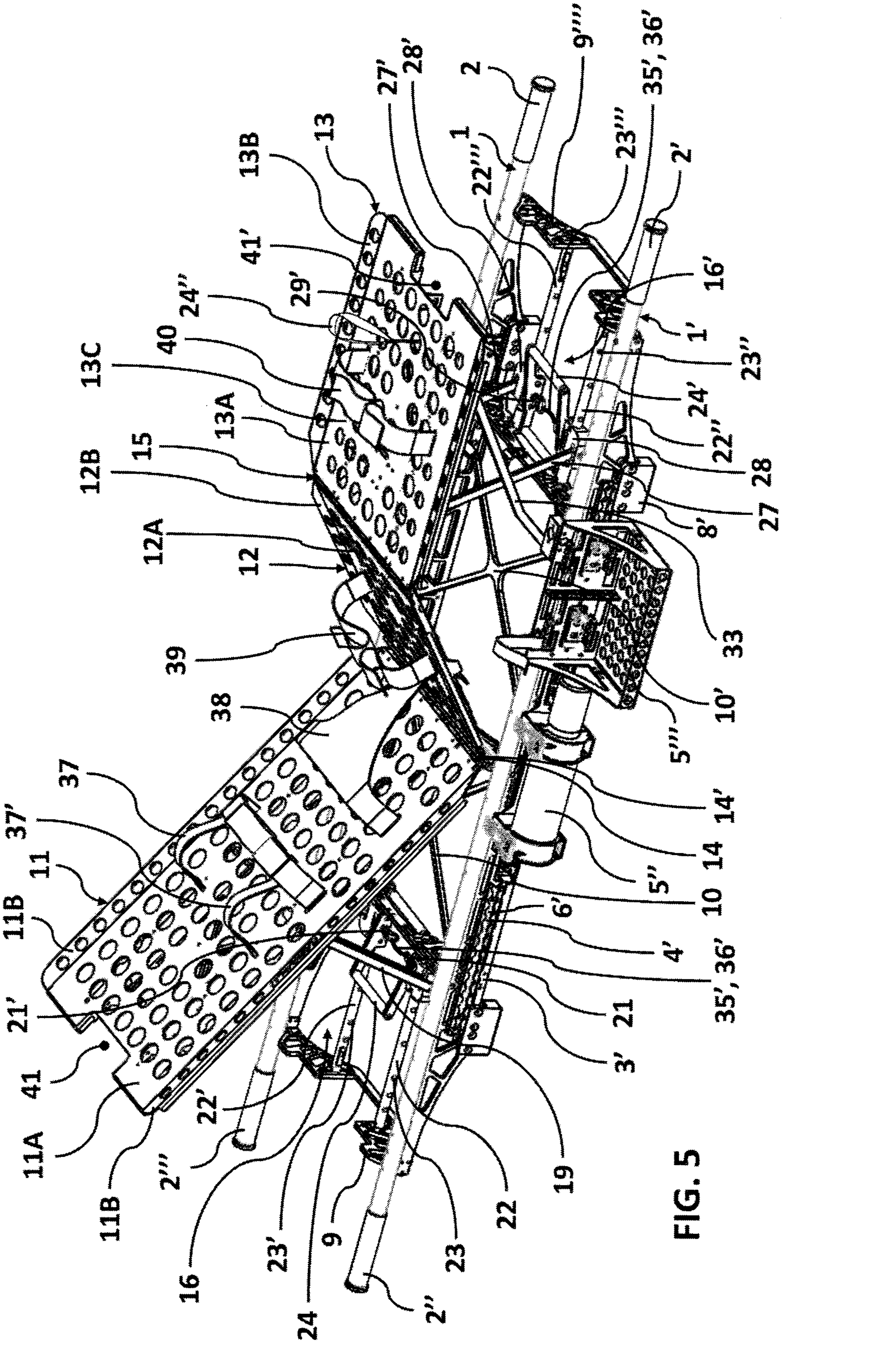
FIG. 5 illustrates, in a top perspective view, the stretcher of FIG. 4 with the raised trays.
Figure 6:
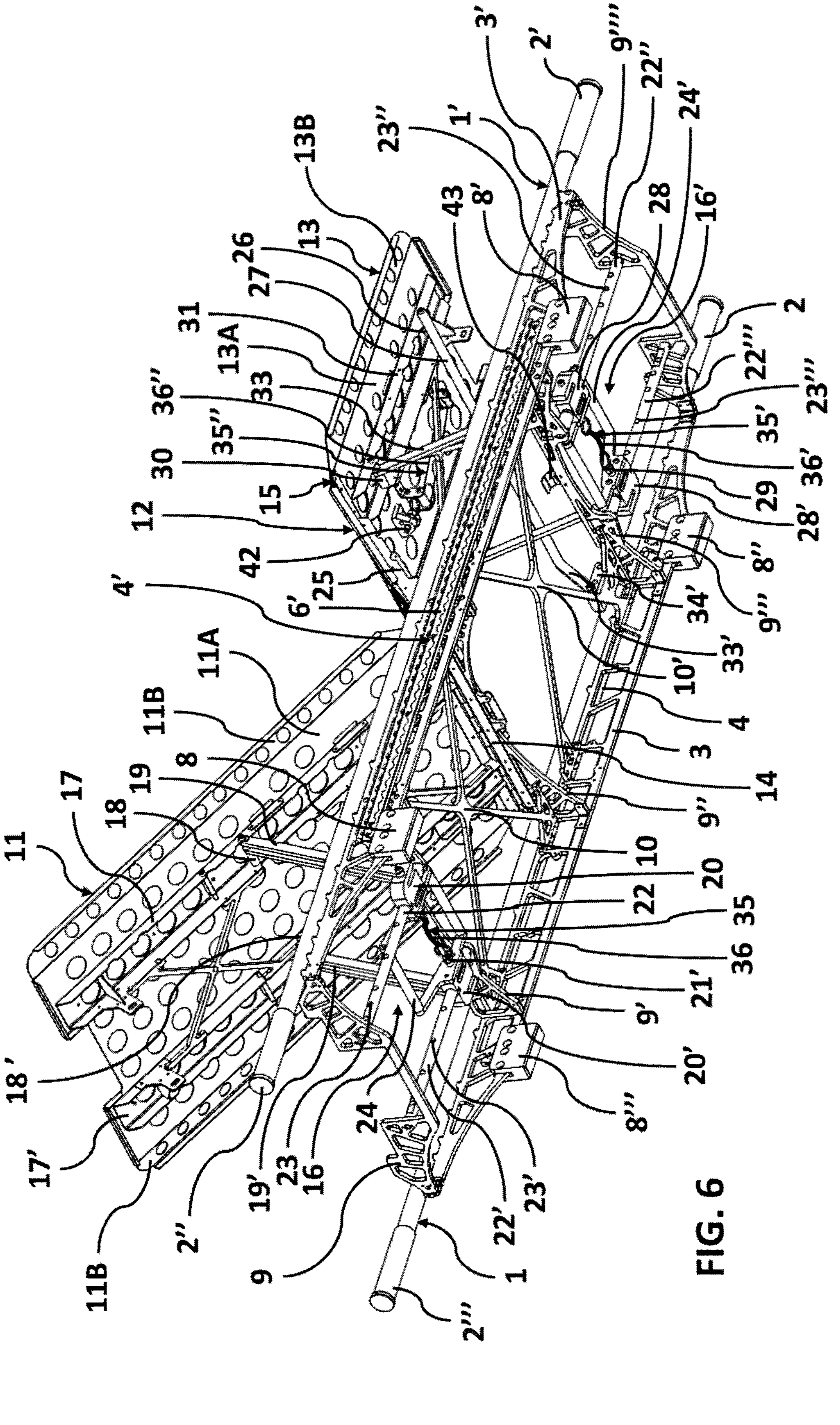
FIG. 6 illustrates, in a bottom perspective view, the stretcher of FIGS. 4 and 5 with the raised trays. The assistance equipment for the transported patient, as well as the patient holding system, have been omitted from this figure.
Figure 7:
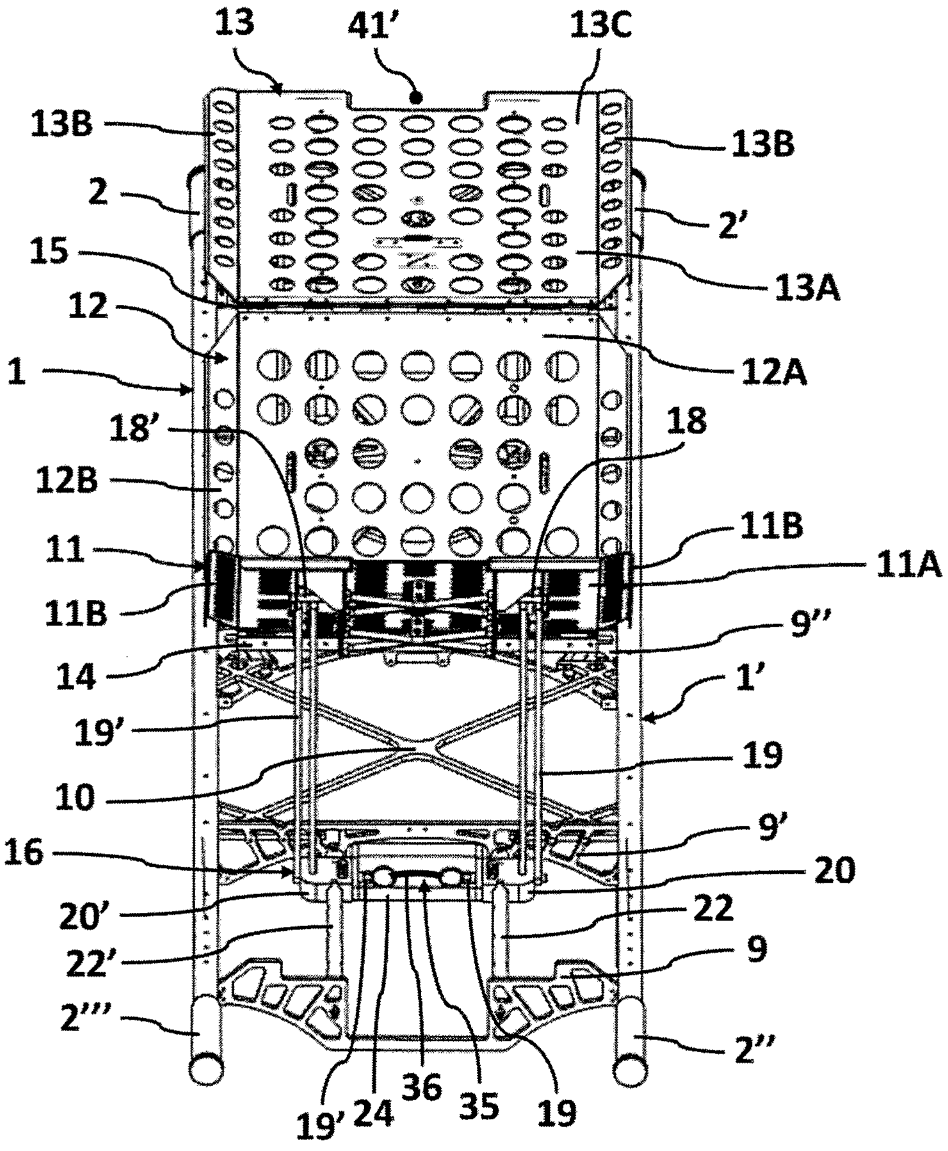
FIG. 7 illustrates, in a top rear perspective view, the stretcher of FIG. 6.
Figure 8:
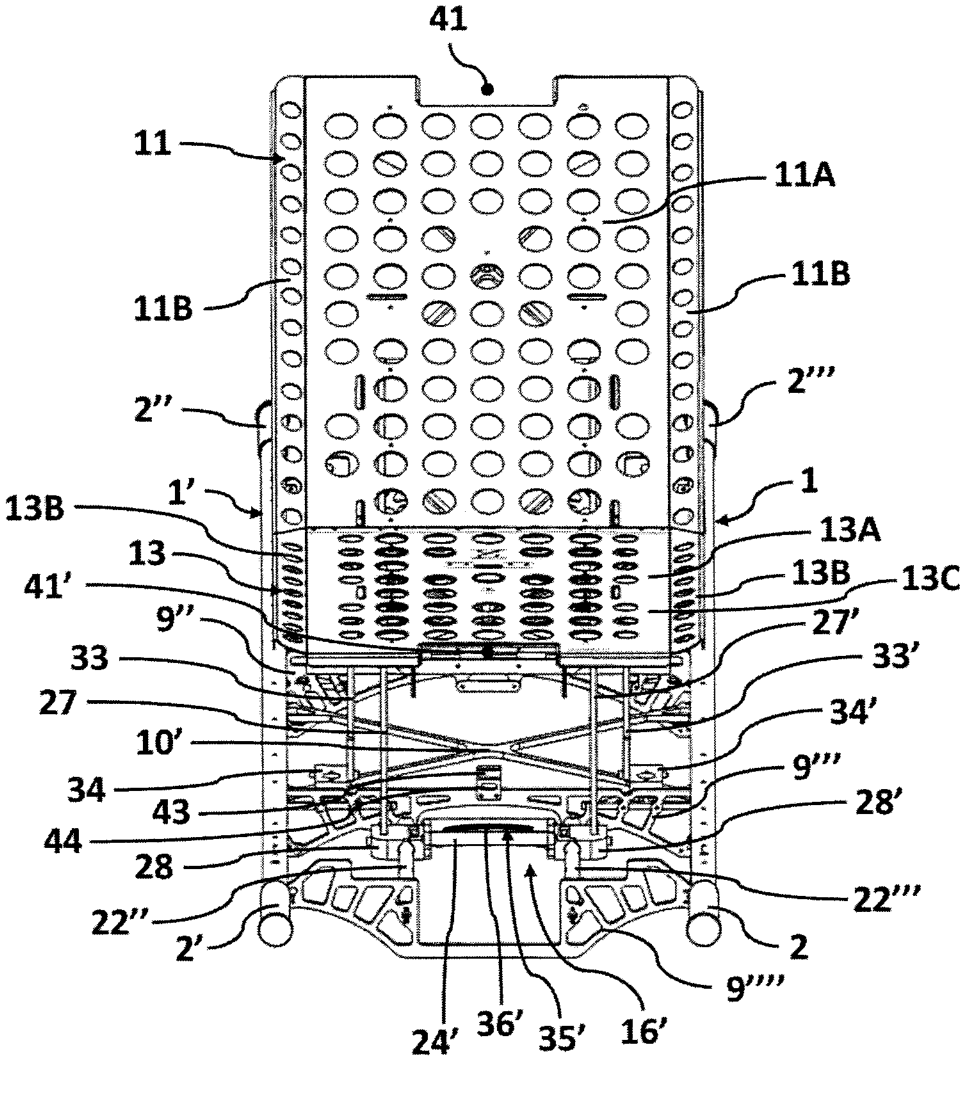
FIG. 8 illustrates, in a top front perspective view, the stretcher of FIGS. 6 and 7.

As in the embodiment of FIGS. 4 to 10, the second lifting system 16' can advantageously comprise a (third) handle 24", which is connected to the leg tray 13, and which projects from an upper face 13C of the leg tray 13. The third handle 24" is advantageously separate from the patients holding system 37, 37', 38, 39, 40, that is to say that the third handle 24" preferably is not part of the patient holding system 37, 37', 38, 39, 40, and is therefore not designed to allow the patient to be supported, in particular with respect to the leg tray 13. For example, the third handle 24' can be formed of a strap portion, one end of which forms a manually graspable buckle (FIGS. 4 and 5). By means of such a third handle 24", it is thus possible to manually accompany and assist the lifting, and conversely the folding, of the thigh tray 12 and of the leg tray 13, in particular in presence of a patient on the stretcher weighing on the trays 12, 13. The third handle 24" thus facilitates the lifting of the thigh tray 12 and the leg tray 13 by a user, the latter exercising on the third handle 24" an upward pulling force. Mutually, the third handle 24" makes it possible to reduce the risk of injury and/or damage to the stretcher related to excessively sudden folding of the thigh tray 12 and the leg tray 13 due to the effect of the patients weight, the user can control the folding speed of the trays 12, 13 using said third handle 24". Preferably, the third handle 24" is arranged in an area of an upper face 13C of the leg tray 13 belonging to a lower half of said upper face 13C, that is to say closer to the lower end than to the upper end of the leg tray 13, and therefore far from the third articulation system 15. This makes it possible in particular to optimize the leverage effect and thus to further facilitate the lifting/folding of the thigh tray 12 and of the leg tray 13.

Figure 9:
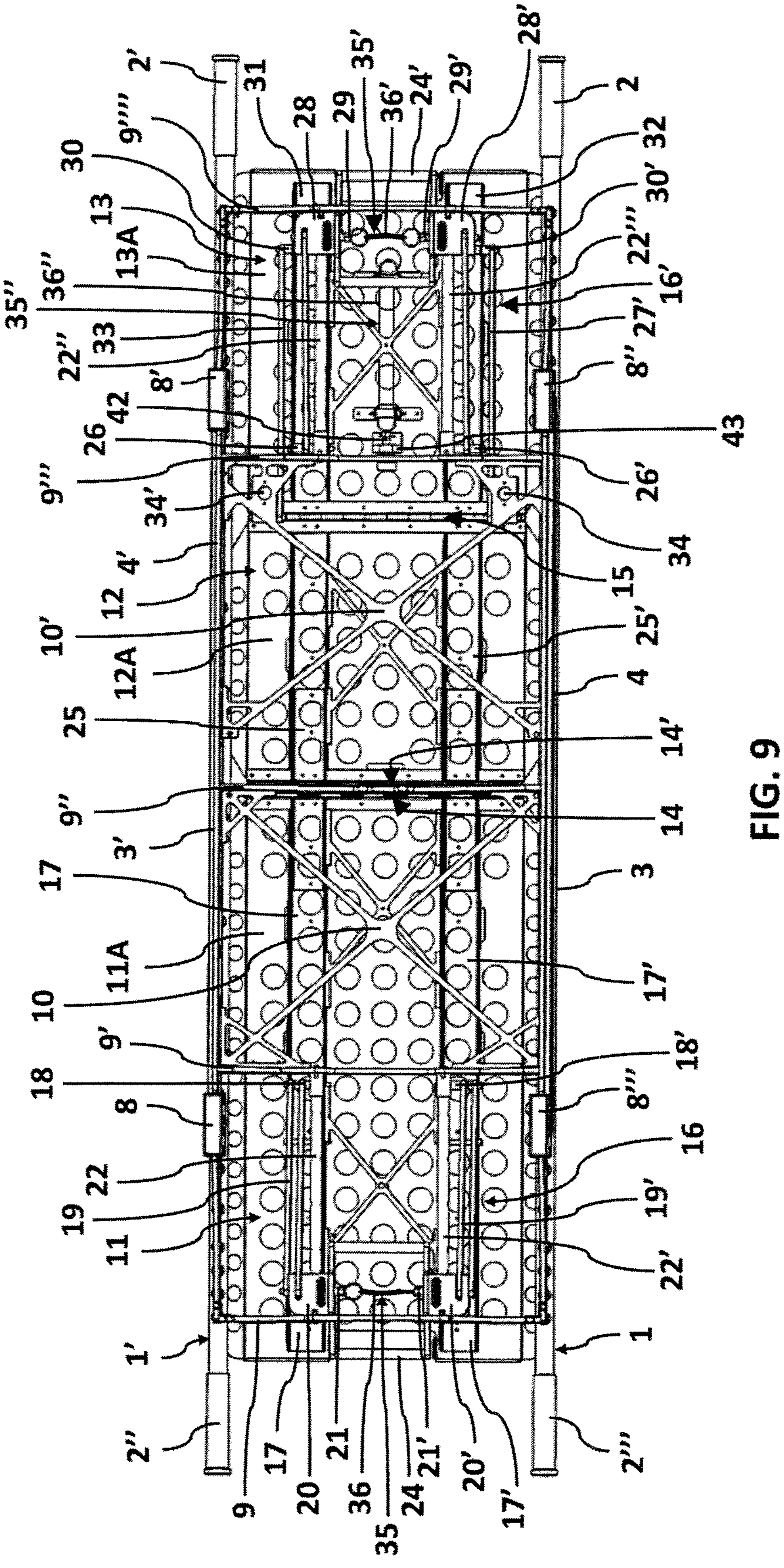
FIG. 9 illustrates, according to a bottom view, the stretcher of FIGS. 4 to 8. The lying surface is shown horizontal, and the assistance equipment of the transported patient, as well as the patient holding system, have been omitted.

In addition to the second indexing finger(s) 29, 29' designed and configured to lock the thigh tray 12 and the leg tray 13 in the desired position by cooperation with at least one of the slots 23", 23'" of the second pierced bar(s) 22", 22'", the stretcher can advantageously comprise an auxiliary device for locking the thigh tray 12 and the leg tray 13 in the folded position, that is to say in an advantageously horizontal position (FIGS. 4 and 9). Separate from the second indexing fingers 29, 29', the auxiliary locking device advantageously makes it possible to further reinforce the locking of the thigh tray 12 and of the leg tray 13 in the folded position, and in particular to limit the risk of inadvertent lifting of the trays 12, 13 in particular in the vicinity of the third articulation system 15. For example, the auxiliary locking device may comprise a (third) indexing finger 42 secured to the leg tray 13 and a part 43 pierced with a (third) slot 44 and fixedly attached to the frame, the third indexing finger 42 being designed and configured to lock the thigh tray 12 and the leg tray 13 in the folded position when the third indexing finger 42 is introduced into the third slot 44 of the pierced part 43. For example, the pierced part 43 is attached to one of the bridges 9'" of the frame.

Particularly advantageously, as in the embodiment of FIGS. 4 to 10, the third handle 24" can then be connected to the auxiliary locking device to allow unlocking of the auxiliary locking device by exerting a tensile force on the third handle 24". As such, the stretcher may comprise a (third) mechanical means 35" which connects the third indexing finger 42 to the third handle 24" so that a tensile exerted on the third handle 24" causes a retraction of the third indexing finger 42 out of the third slot 44, and therefore an unlocking of the auxiliary locking device. Thus, to modify the position of the thigh tray 12 and the leg tray 13 when the latter are locked in the folded position, it is necessary to proceed to a (double) unlocking, on the one hand of the second indexing finger(s) 29, 29', advantageously via the second handle 24' and the second graspable part 36' previously mentioned, and on the other hand of the third indexing finger 42 via the third handle 24". The design and the implementation of the stretcher are thus simplified and made more ergonomic for the user(s) of the stretcher.

Advantageously, as in the embodiments illustrated in the figures, the frame of the stretcher can be provided with systems 8, 8', 8", 8'" for anchoring the stretcher to a transport vector (or vehicle), for example on a rolling cart, in an aircraft (helicopter, airplane, etc.), or even in a road vehicle (ambulance, etc.). The anchoring systems 8, 8', 8", 8'" can be of any known type and suitable for the purpose of anchoring, and preferably of immobilizing, the stretcher with respect to the transport vector, to secure the stretcher, and the patient possibly transported by the latter, when the stretcher is embarked by the transport vector (or vehicle). For example, the anchoring systems 8, 8', 8", 8'" can constitute anchoring feet designed and configured to lock temporarily, reversibly, in aeronautical rails with which could be provided the floor of a transport vector/vehicle. Even more advantageously, the stretcher can be provided with projections 7, 7', 7", 7'", positioned for example at the level of a lower portion of the pole reinforcements 3, 3' as illustrated in the figures, and designed and configured to receive, preferably in a removable manner, the anchoring systems 8, 8', 8", 8'". Thus, it is in particular possible to use the same design of stretcher frame and lying surface in combination with anchoring systems 8, 8', 8", 8'" of different types, depending on the intended application and the specificities of the used transport vectors/vehicles. Optionally, the lying surface can advantageously be provided with removable mattresses or cushions (not illustrated), which then advantageously cover the support plates 11A, 12B, 13A of the trays 11, 12, 13. Recesses are then advantageously provided through the plates 11A, 12B, 13A, as visible in the figures, so as to allow the passage of the various elements of the system 37, 37', 38, 39, 40 for holding the patient, and if necessary of the third handle 24".

Below will now be described in more detail the particularly preferred embodiments of a stretcher according to the invention illustrated in the figures, in direct connection with the general presentation made hereinabove, in order to illustrate and supplement, when needed, the foregoing.

Figure 2:
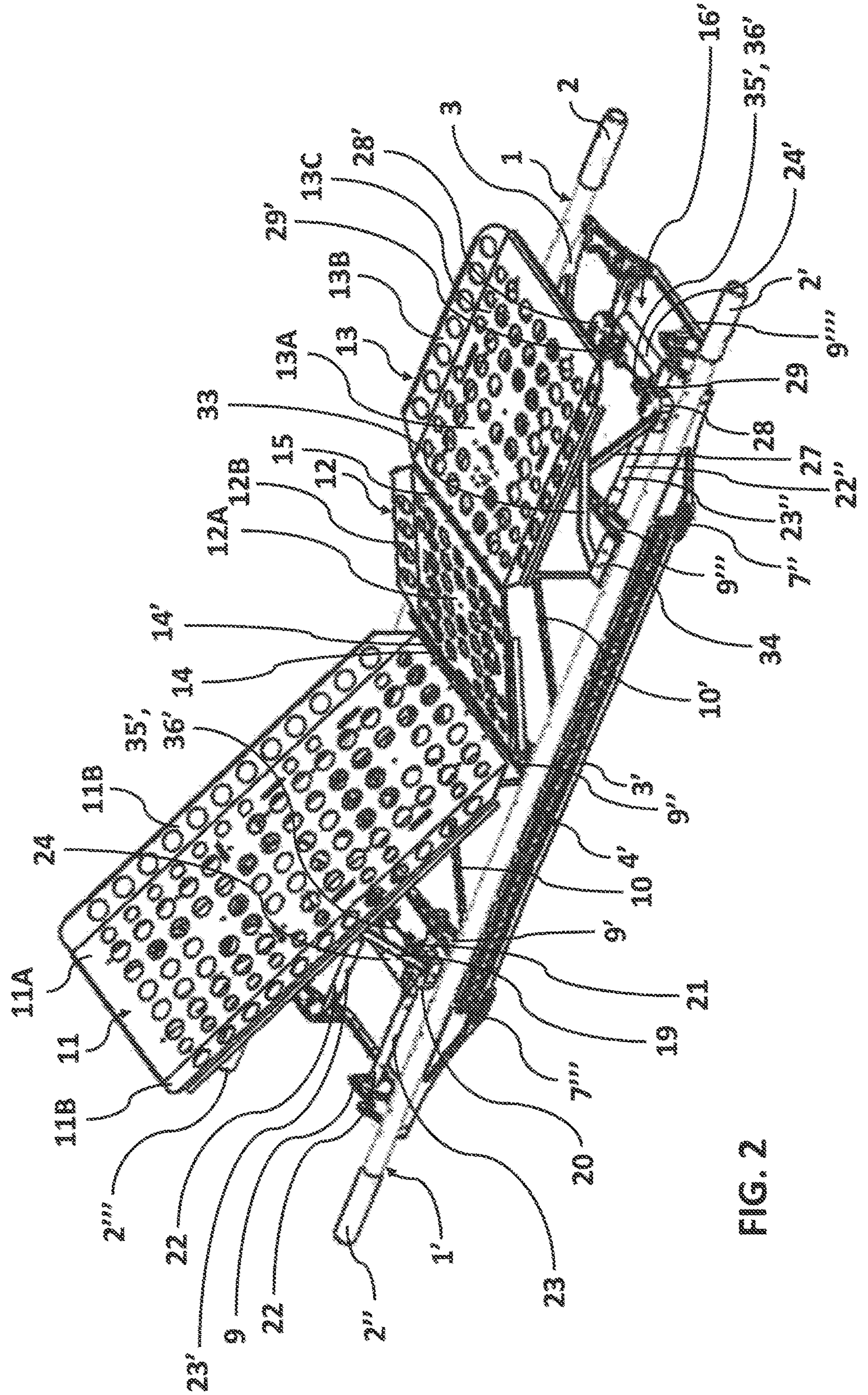
FIG. 2 illustrates, in a top perspective view, the stretcher of FIG. 1 with the raised trays. The assistance equipment for the transported patient, as well as the patient holding system, have been omitted from this figure.
Figure 3:
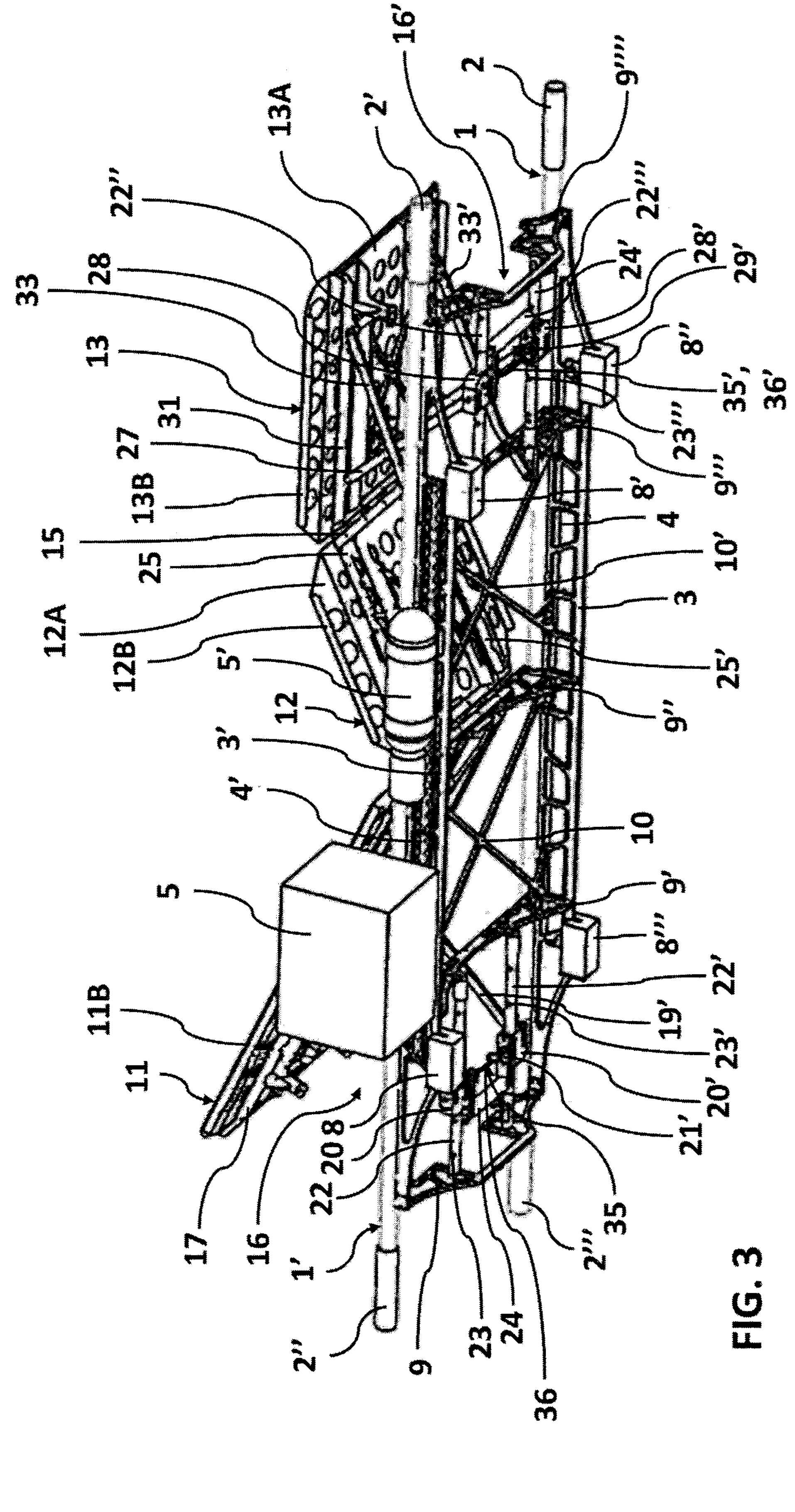
FIG. 3 illustrates, in a bottom perspective view, the stretcher with raised trays of FIG. 2. Equipment for assisting the transported patient, such as medical equipment, is shown attached to the stretcher using an attachment system. The frame is illustrated with systems for anchoring the stretcher to a transport vector, received by the projections visible in FIGS. 1 and 2.

In a particular embodiment of the invention, illustrated in FIGS. 1, 2 and 3, the stretcher consists of one (or, more precisely, comprises one) frame comprising two poles 1, 1' which can be possibly metal tubes of the same length placed parallel at a defined distance, these tubes being provided with handles 2, 2', 2", 2'" which can be non-slip handles. On each pole reinforcement 3, 3', possibly metal pole reinforcement, which can advantageously be perforated, stiffening the pole 1, 1', a system 4, 4' for attaching assistance equipment 5, 5' to the patient is integrally incorporated into the pole reinforcement 3, 3'. This attachment system 4, 4' has a series of identical repetitive shapes made up of cells 6, 6' separated by narrowings that can be an aeronautical type rail. In the lower portion, these pole reinforcements 3, 3' have projections 7, 7', 7", 7'" on which anchoring systems 8, 8', 8", 8' are fitted for allowing the stretcher to be locked in or on a transport vector (or "vehicle"). As previously introduced, the systems 4, 4' for attaching the assistance equipment 5, 5' to the patient have several advantages: they make it possible to secure the equipment 5, 5' essential for the care of the patient so as to avoid the rupture of the patient/equipment connection, to easily reposition the location and/or the replacement of equipment, to remain in position during the transfer in a transport vector in the event that the latter would not have a system for attaching this equipment. The systems 4, 4' for attaching the assistance equipment 5, 5' to the patient can receive compatible attachment systems allowing rapid stowage and release of assistance equipment 5, 5', such as medical devices accompanying the patient such as, for example, the attachment system described in patent EP 1342662 B1 by the same inventor.

The pole reinforcements 3, 3' are interconnected by bridges 9, 9', 9", 9'", 9"", and stiffeners 10, 10' which maintain the rigidity of the two poles 1, 1', thus forming a frame to attach the patient's lying surface. The lying surface consists of several trays 11, 12, 13 perforated and raised on the edges, namely a back tray 11, a thigh tray 12, and a leg tray 13. These articulated trays 11, 12, 13 allow to choose the most medically appropriate position. The back tray 11 is connected at its bottom end (or lower end) by a (first) articulation system 14 to one of the bridges 9". The thigh tray 12 is connected at one of its ends (upper end) by a (second) articulation system 14' to this same bridge 9" and connected at the other end (lower end) by a (third) articulation system 15 to the leg tray 13. The connection of the two leg/thigh trays 13, 12 has the consequence that the thigh tray 12 changes position concomitantly with the leg tray 13. The stretcher is equipped with a lifting system 16, 16' at each of its ends. These lifting systems 16, 16' are explained hereinbelow. At one end of the stretcher, a (first) lifting system 16 actuates the backrest, that is to say the back tray 11. At the other end of the stretcher, a (second) lifting system 16' actuates the leg tray 13 articulated to the thigh tray 12 and causes inclination kinematics of the thigh tray 12 and a horizontal elevation of the leg tray 13. On the back of the back tray 11 are installed two reinforcements 17, 17' equipped with (first) pins 18, 18', from which are articulated two connecting rods 19, 19' connected to two (first) sliders 20, 20', each first slider 20, 20' being provided with one or more (first) indexing fingers 21, 21'. Each first slider 20, 20' slides on a (first) bar 22, 22' pierced with slots 23, 23', into which the first indexing finger(s) 21, 21' is/are introduced depending on the inclination of the back tray 11. The first pierced bars 22, 22' are attached between two bridges 9, 9'. At the other end of the stretcher, a system actuates the lifting of the leg tray 13. The two reinforcements 25, 25' located at the back of the leg tray 13, are equipped with two (second) pins 26, 26' from which are articulated two (second) connecting rods 27, 27' each connecting a (second) slider 28, 28' provided with a (second) indexing finger 29, 29', these two second sliders 28, 28' sliding on two (second) bars 22", 22'" pierced with slots 23", 23'" into which the second indexing fingers 29, 29' are introduced depending on the inclination of the thigh tray 12. The second bars 22", 22'" pierced with slots 23", 23'" are attached between two bridges 9", 9"". From the two other pins 30, 30' (third pins) attached to two other ends of the reinforcement 31, 32 placed at the back of the leg tray 13, a (third) connecting rod 33, 33' joins a platen 34, 34' attached to the stiffener 10' between the two reinforcements 3, 3' of the pole 1, 1'. The two second indexing fingers 29, 29' are connected by a mechanical means 35' which can be or comprise a cable or a cable portion, the mere fact of actuating this cable causes the second indexing fingers 29, 29' to retract and then fit into other slots chosen to modify the inclination of the thigh backrest (thigh tray) 12 and of the leg backrest (leg tray) 13.

The holding system of the patient, in the examples illustrated in the figures, consists of two shoulder straps 37, 37', a crotch strap 38, a thigh strap 39, and a leg strap 40. The holding system 37, 37', 38, 39, 40 of the patient is secured to the tray 11, 12, 13 reinforcements 17, 17', 25, 25', 31, 32. The holding system makes it possible to keep the patient attached regardless of the inclination taken by the backrest (back tray 11) and/or the position of the thigh 12 and leg 13 trays. The straps 37, 37', 38, 39, 40 are attached directly to the lying surface at the level of the backrest (back tray 11), the support thigh and leg trays (thigh tray 12) and (leg tray 13), and are more precisely secured to the reinforcements 17, 17', 25, 25', 31, 32 located at the back of the back tray 11, of the thigh tray 12 and of the leg tray 13. Furthermore, the lying surface can advantageously be provided with removable mattresses (not represented in the figures), which then advantageously cover the plates 11A, 12B, 13A for supporting the trays 11, 12, 13 and which are provided with recesses through which pass the straps 37, 37', 38, 39, 40.

Figure 10:
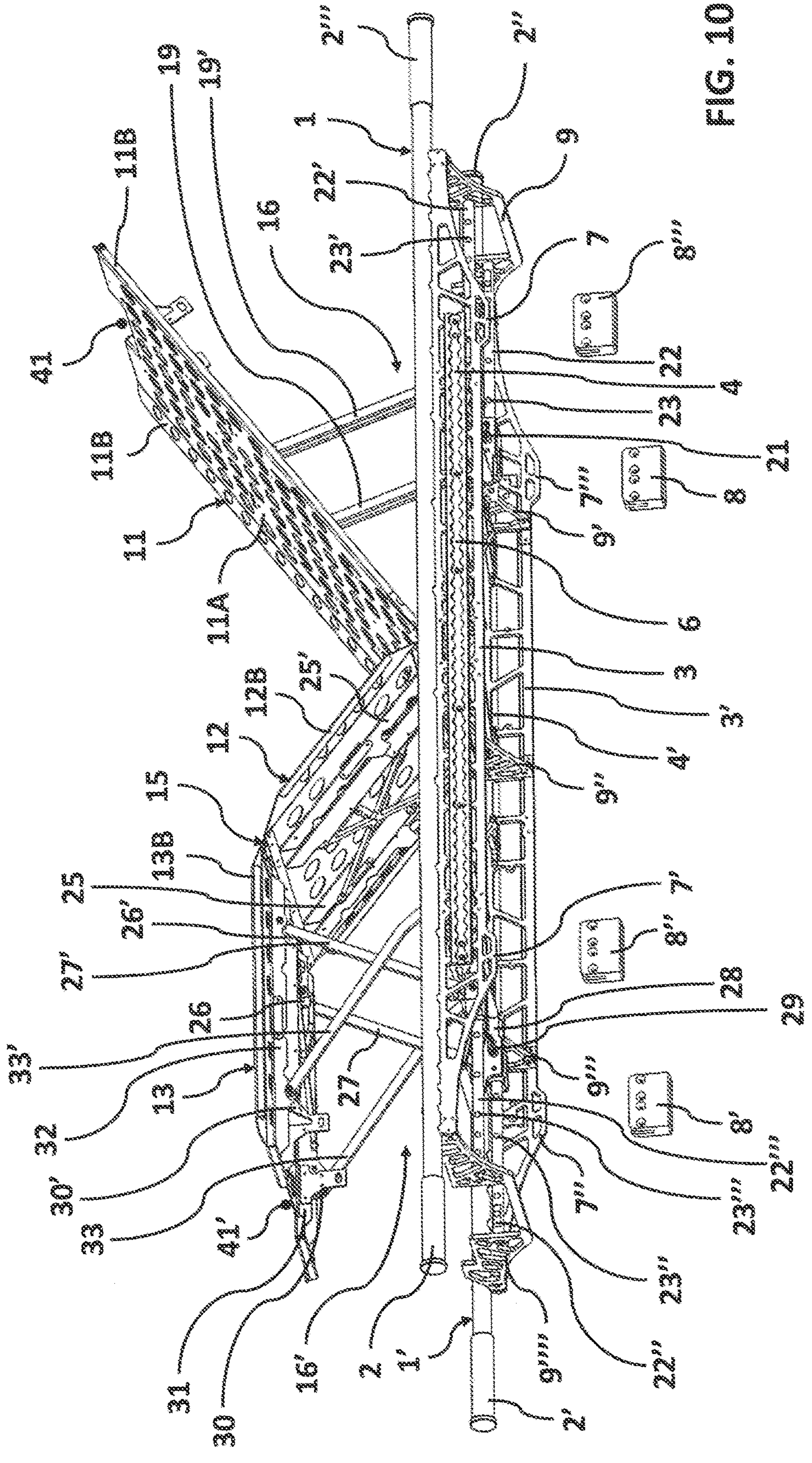
FIG. 10 illustrates, in a lateral perspective view, the stretcher of FIGS. 4 to 9. The trays of the lying surface are raised. The assistance equipment for the transported patient, as well as the patient holding system, have been omitted. The systems for anchoring the stretcher to a transport vector are illustrated detached and away from the projections intended to receive them.

The stretcher according to the embodiment illustrated in FIGS. 4 to 10 is substantially identical to that of the embodiment of FIGS. 1 to 3 described hereinabove, except for the differences specified in what follows. For the sake of simplicity, identical reference numerals have therefore been used to designate identical or similar parts or elements in the figures. The stretcher of FIGS. 4 to 10 differs from that of FIGS. 1 to 3 in that the assistance equipment 5", 5'" illustrated as an example in FIGS. 4 and 5 are different from those illustrated in FIG. 1. The stretcher of FIGS. 4 to 10 also differs from that of FIGS. 1 to 3, in that the back tray 11 and the leg tray 13 of the stretcher of FIGS. 4 to 10 are provided with setbacks 41, 41', respectively provided in a upper edge of the back tray 11 and in a lower edge of the leg tray 13, to facilitate direct manual access to the handles 24, 24' and to respective movable graspable parts 36, 36' of the lifting systems 16, 16' of the trays 11, 12, 13, in particular when the back tray 11 and/or the leg tray 13 are folded up, in the "horizontal" position, against the frame (FIGS. 4 and 10). The stretcher according to the embodiment illustrated in FIGS. 4 to 10 further comprises a third handle 24" (omitted in FIGS. 6 to 10), as previously described, connected to the leg tray 13 and allowing a more easier and even more secure lifting/folding of the thigh tray 12 and the leg tray 13. The stretcher further comprises an auxiliary device for locking the thigh tray 12 and the leg tray 13 in the folded position. In this case, the auxiliary locking device comprises a third indexing finger 42, arranged under the plate 13A of the leg tray 13 and integral with the latter, and a part 43 pierced with a third slot 44. The pierced part 43 is herein fixedly attached to that of the two bridges 9'" of the frame, to which are attached the second pierced bars 22", 22'" the most internal to the frame. The third handle 24" is formed of a strap portion, one end of which forms a manually graspable buckle, and the other end of which crosses the plate 13A of the leg tray 13 via a slot pierced through said plate 13A. The third handle 24" is connected to the auxiliary locking device to allow the latter to be unlocked by exerting a tensile force on the third handle 24", via a third mechanical means 35" comprising a cable 36" double-guided by two pairs of rollers attached under the plate 13A of the leg tray 13 and connected on the one hand to the third indexing finger 42 and on the other hand to the through-end of the third handle 24" by metal rings.

It should be noted that, in the foregoing, the terms "first", "second" and "third" are used only for the sake of clarity, to avoid possible confusion between two identical designation items. They could therefore as such be respectively replaced for example by the terms "primary", "secondary" and "tertiary". In any case, these terms do not carry, as such, any technical limitation, and do not imply any particular order of precedence between the concerned items. They may be deleted or ignored if there is no risk of confusion.

POSSIBILITY OF INDUSTRIAL APPLICATION

The invention finds its application in the technical field of the design and manufacture of stretchers intended for the transport of patients.

The invention claimed is:

1. A stretcher intended for transporting patients comprising:

- a frame including poles (1, 1'), the ends of which act as carrying handles (2, 2', 2", 2'"), said frame being equipped with at least one attachment system (4, 4') making it possible to attach at least one assistance piece of equipment (5, 5') to a patient being transported;
- a series of trays (11, 12, 13) constituting a lying surface which can be articulated according to the desired positions for the patient, said articulated trays (11, 12, 13) being attached by means of articulation systems (14, 15) to the frame, said trays (11, 12, 13) being provided with a system (37, 37', 38, 39, 40) for holding the patient;
- a first lifting system (16) for modifying the position of the back tray (11), said first lifting system (16) comprising at least one first pin (18, 18') which equips at least one reinforcement (17, 17') of the back tray (11) and from which articulates at least one first connecting rod (19, 19') connected to at least one first slider (20, 20') provided with one or more first indexing fingers (21, 21') and slidably mounted on one or more first bars (22, 22') pierced with slots (23, 23') into which is introduced the or at least one of the first indexing fingers (21, 21') depending on the position of the back tray (11), wherein the first indexing finger(s) (21, 21') is/are designed and configured to lock the back tray (11) in the desired position when the first indexing finger(s) (21, 21') is/are introduced into at least one of the first slots (23, 23') of the first pierced bar(s) (22, 22'); and
- a plurality of first indexing fingers (21, 21'), said first lifting system comprising a first device for unlocking the position of the back tray (11), said first unlocking device comprising a first mechanical means (35) which interconnects said first indexing fingers (21, 21').

2. The stretcher according to claim 1, wherein the frame comprises pole reinforcements (3, 3') on which said poles (1, 1') bear, said poles (1, 1') and said pole reinforcements (3, 3') being interconnected by bridges (9, 9', 9", 9'", 9"") and stiffeners (10, 10').

3. The stretcher according to claim 1, wherein the series of trays (11, 12, 13) constituting the lying surface is formed of a back tray (11), a thigh tray (12) and a leg tray (13).

4. The stretcher according to claim 3, wherein the back tray (11) and the leg tray (12) each comprise at least one reinforcement (17, 17', 31, 32) located at the back of said back tray (11) and leg tray (13), the thigh tray (12) preferably also comprising at least one reinforcement (25, 25') located on the back of the thigh tray (12).

5. The stretcher according to claim 2, wherein the first lifting system (16) comprises a first handle (24) to allow a user to manually slide said first slider (20, 20') along said at least one first pierced bar (22, 22'), and in which the first mechanical means (35) interconnecting the first indexing fingers (21, 21') comprises a first graspable part (36) movably mounted with respect to said first handle (24), said first graspable part (36) being arranged close to said first handle (24) to allow the user to bring the first handle (24) and the first graspable part (36) closer together using the fingers of the same hand, for actuating said first unlocking device.

6. The stretcher according to claim 3, which is designed and configured to allow a modification of the inclination of the thigh tray (12) and a joint modification of the altitude of the leg tray (13) relative to an average plane in which average directions of longitudinal extension of the poles (1, 1') are inscribed, the leg tray (13) extending in an average plane of extension which remains parallel to said average plane in which the average directions of longitudinal extension of the poles (1, 1') are inscribed.

7. The stretcher according to claim 2, which comprises a second lifting system (16') to modify the position of the thigh tray (12) and the position of the leg tray (13), said thigh tray (12) being connected by an articulation system (15) to the leg tray (13), said second lifting system (16') comprising at least one second pin (26, 26') which equips the reinforcement (31, 32) of the leg tray (13) and from which is articulated at least one second connecting rod (27, 27') connected to at least one second slider (28, 28') provided with one or more second indexing fingers (29, 29') and slidably mounted on one or more second bars (22", 22'") pierced with slots (23", 23'") in which the or at least one of the second indexing fingers (29, 29') depending on the position of the thigh tray (12) is/are introduced.

8. The stretcher according to claim 6, wherein said second lifting system (16') comprises at least one third pin (30, 30') which equips the reinforcement (25, 25') of the leg tray (13) and from which is articulated at least one third connecting rod (33, 33') pivotally connected to the frame, so that the sliding of said second slider (28, 28') causes a modification of the inclination of the thigh tray (12) and a joint modification of the altitude of the leg tray (13).

9. The stretcher according to claim 7, wherein the second indexing finger(s) (29, 29') is/are designed and configured to lock the thigh tray (12) and the leg tray (13) to the desired position when the second indexing finger(s) (29, 29') is/are introduced into at least one of the second slots (23", 23'") of the second pierced bar(s) (22', 22'").

10. The stretcher according to claim 9, which comprises a plurality of second indexing fingers (29, 29'), said second lifting system (16') comprising a second device for unlocking the position of the thigh plate (12) and the leg plate (13), said second unlocking device comprising a second mechanical means (35') which interconnects said second indexing fingers (29, 29').

11. The stretcher according to claim 10, wherein the second lifting system comprises a second handle (24') to allow a user to manually slide said second slider (28, 28')

along said at least one second pierced bar (22", 22'"), and wherein the second mechanical means (35') interconnecting the second indexing fingers (29, 29') comprises a second graspable part (36') movably mounted relative to said second handle (24'), said second graspable part (36') being arranged close to said second handle (24') to allow the user to bring the second handle (24') and the second graspable part (36') closer together, using the fingers of the same hand, for actuating said second unlocking device.

12. The stretcher according to claim 7, wherein the second lifting system (16') comprises a third handle (24") connected to the leg tray (13) and which projects from an upper face (13C) of the leg tray (13).

13. The stretcher according to claim 12, which comprises an auxiliary device for locking the thigh tray (12) and the leg tray (13) in the folded position.

14. The stretcher according to claim 13, wherein said third handle (24") is connected to said auxiliary locking device to allow unlocking of said auxiliary locking device by exerting a tensile force on said third handle (24").

15. The stretcher according to claim 1, wherein the system (4, 4') for attaching the assistance piece of equipment (5, 5', 5", 5'") is positioned on the at least one of said pole reinforcements (3, 3').

16. The stretcher according to claim 1, wherein the system (4, 4') for attaching the assistance piece of equipment (5, 5', 5", 5'") is integral with the frame and provided with a series of identical repetitive shapes composed of cells (6, 6') separated by narrowings.

17. The stretcher according to claim 1, wherein each of said trays (11, 12, 13) comprises a rigid plate (11A, 12A, 13A) for supporting the patient, preferably perforated, the side edges (11B, 12B, 13B) of which are curved upwards.

18. The stretcher according to claim 4, wherein the system (37, 37', 38, 39, 40) for holding the patient is secured to the reinforcements (17, 17', 25, 25', 31, 32) of said trays (11, 12, 13).

19. The stretcher according to claim 1, wherein said frame is provided with anchoring systems (8, 8', 8", 8'") of the stretcher to a transport vector.

20. The stretcher according to claim 19 characterized in that it is provided with projections (7, 7', 7", 7'") designed and configured to receive said anchoring systems (8, 8', 8", 8'").

* * * * *